(12) United States Patent
Mate et al.

(10) Patent No.: US 9,396,757 B2
(45) Date of Patent: Jul. 19, 2016

(54) VIDEO REMIXING SYSTEM

(75) Inventors: Sujeet Mate, Tampere (FI); Igor D. Curcio, Tampere (FI); Kostadin Dabov, Tampere (FI)

(73) Assignee: Nokia Technologies Oy, Espoo (FI)

(*) Notice: Subject to any disclaimer, the term of this patent is extended or adjusted under 35 U.S.C. 154(b) by 16 days.

(21) Appl. No.: 14/126,385

(22) PCT Filed: Jun. 21, 2011

(86) PCT No.: PCT/FI2011/050599
§ 371 (c)(1),
(2), (4) Date: Dec. 13, 2013

(87) PCT Pub. No.: WO2012/175783
PCT Pub. Date: Dec. 27, 2012

(65) Prior Publication Data
US 2014/0133837 A1    May 15, 2014

(51) Int. Cl.
*G11B 27/031* (2006.01)
*G11B 27/034* (2006.01)
*H04N 13/00* (2006.01)

(52) U.S. Cl.
CPC ............ *G11B 27/031* (2013.01); *G11B 27/034* (2013.01); *H04N 13/0048* (2013.01)

(58) Field of Classification Search
USPC ................................................. 386/278–285
See application file for complete search history.

(56) References Cited

U.S. PATENT DOCUMENTS

| 7,751,683 | B1* | 7/2010 | Belknap | 386/278 |
| 2003/0058268 | A1* | 3/2003 | Loui | G06F 17/30802 |
| | | | | 715/719 |
| 2005/0193421 | A1* | 9/2005 | Cragun | 725/80 |
| 2006/0233236 | A1* | 10/2006 | Labrozzi et al. | 375/240.03 |
| 2006/0251382 | A1* | 11/2006 | Vronay et al. | 386/52 |

(Continued)

FOREIGN PATENT DOCUMENTS

| EP | 1416490 | 5/2004 |
| EP | 2091046 | 8/2009 |

(Continued)

OTHER PUBLICATIONS

International Search Report and Written Opinion received for corresponding Patent Cooperation Treaty Application No. PCT/FI2011/050599 dated Apr. 25, 2012, 12 pages.

(Continued)

*Primary Examiner* — Nigar Chowdhury
(74) *Attorney, Agent, or Firm* — Alston & Bird LLP

(57) ABSTRACT

A method and related apparatus for creating a video remix, the method comprising obtaining a plurality of source content in a processing device; determining a plurality of segments from the source content to be included in the video remix; determining editing processes required to transform the plurality of segments into form suitable for the video remix; allocating said editing processes to be executed in parallel in at least one processing device; and merging the plurality of segments received from said editing processes into the video remix.

21 Claims, 6 Drawing Sheets

(56) References Cited

U.S. PATENT DOCUMENTS

| | | |
|---|---|---|
| 2006/0253857 A1 | 11/2006 | Wu et al. |
| 2009/0087161 A1 | 4/2009 | Roberts et al. |
| 2009/0097815 A1 | 4/2009 | Lahr et al. |
| 2009/0196570 A1* | 8/2009 | Dudas et al. .................. 386/52 |
| 2010/0146055 A1 | 6/2010 | Hannuksela |
| 2010/0260468 A1* | 10/2010 | Khatib et al. ................. 386/52 |
| 2011/0135194 A1* | 6/2011 | Izumi ............................ 382/164 |
| 2011/0194839 A1* | 8/2011 | Gebert et al. ................. 386/290 |
| 2012/0315020 A1* | 12/2012 | Fiumi ........................... 386/278 |

FOREIGN PATENT DOCUMENTS

| | | |
|---|---|---|
| EP | 2 104 106 A1 | 9/2009 |
| EP | 2 112 663 A2 | 10/2009 |
| WO | WO 03/081594 A1 | 10/2003 |
| WO | 2004081940 | 9/2004 |
| WO | 2010119181 | 10/2010 |

OTHER PUBLICATIONS

Foote, J. et al: "Creating music videos using automatic media analysis," Int. Conf. on Multimedia '02, Dec. 1-6, 2002, Juan-Les-Pins, France, pp. 553-560.
Office Action for Chinese Application No. 201180071774.8 dated Jul. 20, 2015.
Supplementary Partial European Search Report for Application No. EP 11 86 8268 dated Dec. 17, 2015.
Office Action for Chinese Application No. 201180071774.8 dated Jan. 5, 2016.
Wang, K. et al., *Compressed Domain MPEG-2 Video Editing*, IEEE, vol. 1, (Jul. 2000) 225-228.
Wee, S.J. Et al., *Splicing MPEG Video Strams in the Compressed Domain*, IEEE (Jun. 1997) 225-230.
Office Action for Chinese Application No. 201180071774.8 dated Apr. 1, 2016.
Supplementary European Search Report for Application No. EP 11 86 8268 dated Apr. 8, 2016.

* cited by examiner

VIDEO REMIXING SYSTEM

RELATED APPLICATION

This application was originally filed as PCT Application No. PCT/FI2011/050599 filed Jun. 21, 2011.

BACKGROUND

Video remixing is an application where multiple video recordings are combined in order to obtain a video mix that contains some segments selected from the plurality of video recordings. Video remixing, as such, is one of the basic manual video editing applications, for which various software products and services are already available. Furthermore, there exist automatic video remixing or editing systems, which use multiple instances of user-generated or professional recordings to automatically generate a remix that combines content from the available source content. Some automatic video remixing systems depend only on the recorded content, while others are capable of utilizing environmental context data that is recorded together with the video content. The context data may be, for example, sensor data received from a compass, an accelerometer, or a gyroscope, or GPS location data.

Video remixing is computationally a demanding task, especially when multiple recordings possible encoded into different, non-compatible file formats are used as source content. Obtaining a desired resultant video remix may be significantly delayed due to the bottlenecks of the video remixing system. Therefore, a more efficient video remixing system is needed.

SUMMARY

Now there has been invented an improved method and technical equipment implementing the method. Various aspects of the invention include a method, an apparatus, a system and a computer program, which are characterized by what is stated in the independent claims. Various embodiments of the invention are disclosed in the dependent claims.

According to a first aspect, there is provided a method for creating a video remix, the method comprising: obtaining a plurality of source content in a processing device; determining a plurality of segments from the source content to be included in the video remix; determining editing processes required to transform the plurality of segments into form suitable for the video remix; allocating said editing processes to be executed in parallel in at least one processing device; and merging the plurality of segments received from said editing processes into the video remix.

According to an embodiment, the source content comprises at least one of video, audio and/or image, and said editing processes comprise at least one of the following:
  cutting at least one source content into plurality of segments;
  decoding at least a part of a segment of a source content;
  encoding at least a part of a segment of a source content.

According to an embodiment, the method further comprises receiving a user request for creating a video remix, said user request including a request to create the video remix within a time period; determining an optimal allocation of the editing processes such that the editing processes are optimized according to available processing power of said at least one processing device and the video remix can be created within said time period; and allocating said editing processes to be executed in parallel in at least one processing device according to said optimal allocation.

According to an embodiment, the method further comprises obtaining depth maps for at least some frames of a source video; detecting a type of a video shot and/or an object obstructing a view in the source video based on the depth map; and indexing the source video according to the detected type of a video shot and/or the detected object obstructing a view.

According to an embodiment, the method further comprises analysing the depth map of a frame by dividing the depth map of the frame into at least two non-overlapping region-of-interests, one of them being a central region-of-interest, and calculating the depth of each region-of-interest as a weighted average value of the depth, wherein the weighting is based on reliability values of the depth map.

According to an embodiment, the method further comprises detecting the type of the video shot included in the source video to a close-up shot, a medium shot or a long shot by comparing the depth of the central region-of-interest to the depths of the remaining region-of-interests, the criteria for detecting the type of the video shot including at least the number of region-of-interests having a substantially similar depth to the depth of the central region-of-interest and residing within a predefined distance from the central region-of-interest.

According to an embodiment, the method further comprises detecting the object obstructing the view in the source video on the basis of a difference between an averaged depth for region-of-interests having depth substantially at the depth of expected location of obstructing objects and an averaged depth of the remaining region-of-interests.

According to a second aspect, there is provided an apparatus comprising at least one processor, memory including computer program code, the memory and the computer program code configured to, with the at least one processor, cause the apparatus to at least: obtain a plurality of source content; determine a plurality of segments from the source content to be included in a video remix; determine editing processes required to transform the plurality of segments into form suitable for the video remix; allocate said editing processes to be executed in parallel in at least one processing device; and merge the plurality of segments received from said editing processes into the video remix.

According to a third aspect, there is provided a computer program embodied on a non-transitory computer readable medium, the computer program comprising instructions causing, when executed on at least one processor, at least one apparatus to: obtain a plurality of source content; determine a plurality of segments from the source content to be included in a video remix; determine editing processes required to transform the plurality of segments into form suitable for the video remix; allocate said editing processes to be executed in parallel in at least one processing device; and merge the plurality of segments received from said editing processes into the video remix.

According to a fourth aspect, there is provided a system comprising at least one processor, memory including computer program code, the memory and the computer program code configured to, with the at least one processor, cause the system to at least: obtain a plurality of source content; determine a plurality of segments from the source content to be included in a video remix; determine editing processes required to transform the plurality of segments into form suitable for the video remix; allocate said editing processes to be executed in parallel in at least one processing device; and merge the plurality of segments received from said editing processes into the video remix.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIGS. 1a and 1b show a system and devices suitable to be used in an automatic video remixing service according to an embodiment;

Figure 5:
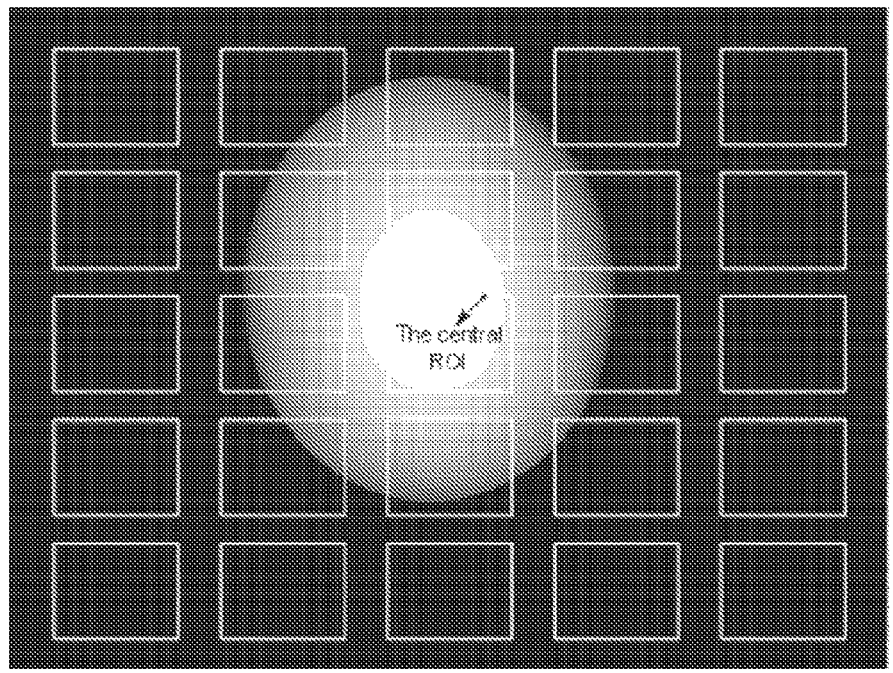
Figure 6:
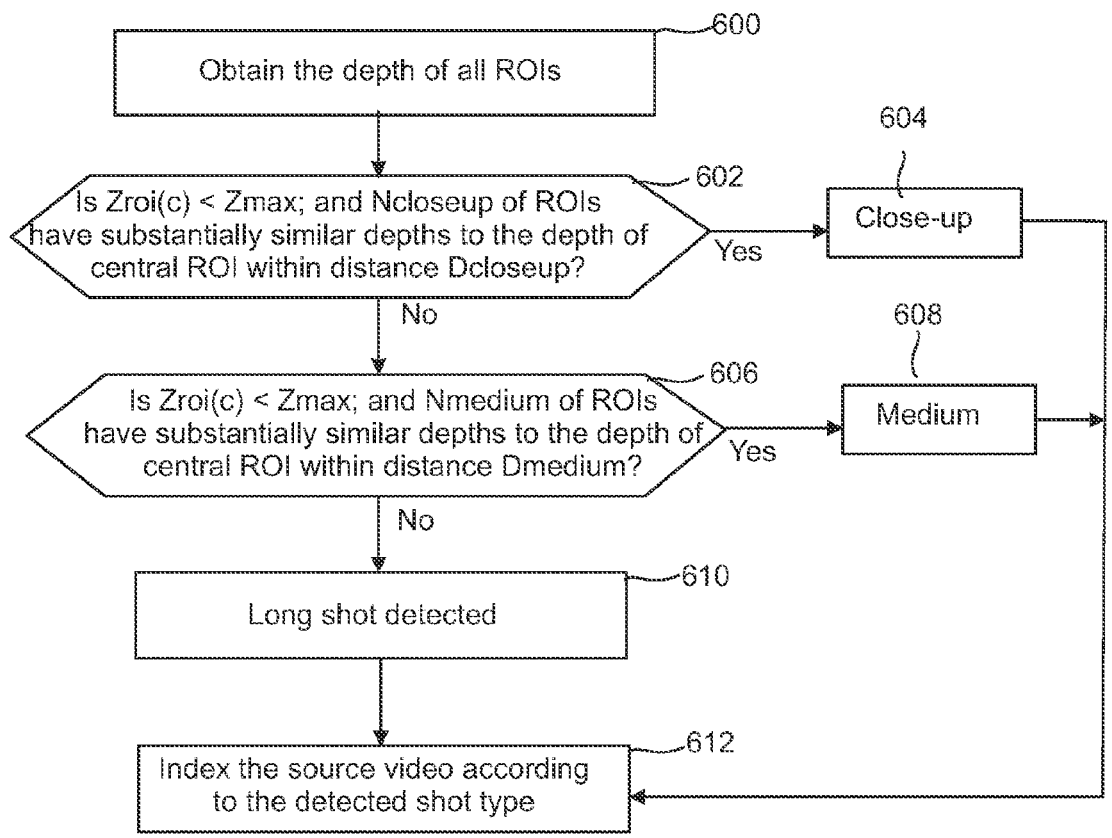
Figure 7:
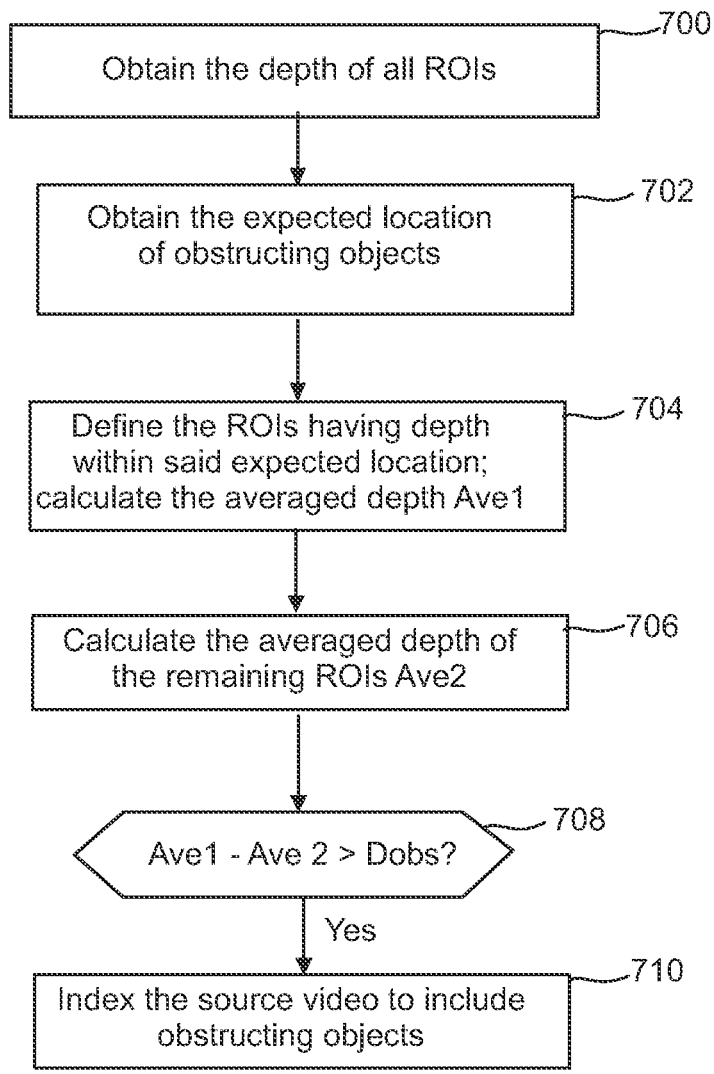

FIG. 5 an example for positioning an amount of non-overlapping regions of interest (ROIs) in the depth maps of the video frames;

FIG. 6 shows a flow chart of an embodiment for detecting the type of video shots on the basis of the depth map of the recorded scene;

FIG. 7 shows a flow chart of an embodiment for detecting objects that obstruct the view on the basis of the depth map of the recorded scene.

DESCRIPTION OF EMBODIMENTS

As is generally known, many contemporary portable devices, such as mobile phones, cameras, tablets, are provided with high quality cameras, which enable to capture high quality video files and still images. In addition to the above capabilities, such handheld electronic devices are nowadays equipped with multiple sensors that can assist different applications and services in contextualizing how the devices are used. Sensor (context) data and streams of such data can be recorded together with the video or image or other modality of recording (e.g. speech).

Usually, at events attended by a lot of people, such as live concerts, sport games, social events, there are many who record still images and videos using their portable devices. The above-mentioned sensors may even automatically trigger an image/video capture of an interesting moment, if detected by a sensor. For example, a loud voice in a party may be an acoustic trigger for a video capture, or people turning suddenly to another direction may be an orientation trigger, received from a compass sensor of the portable device, for a video capture. Spatially nearby portable devices may collaboratively identify an event, and at least locate the portable device with the best view of this event. The devices recording the content may be disconnected from other devices, but share the recorded source content and the corresponding sensor data, which is pooled together in a file server or any such suitable mechanism for generating the automatic remix. Recordings of the attendants from such events, possibly together with various sensor information, provide a suitable framework for the present invention and its embodiments.

Figure 1A:
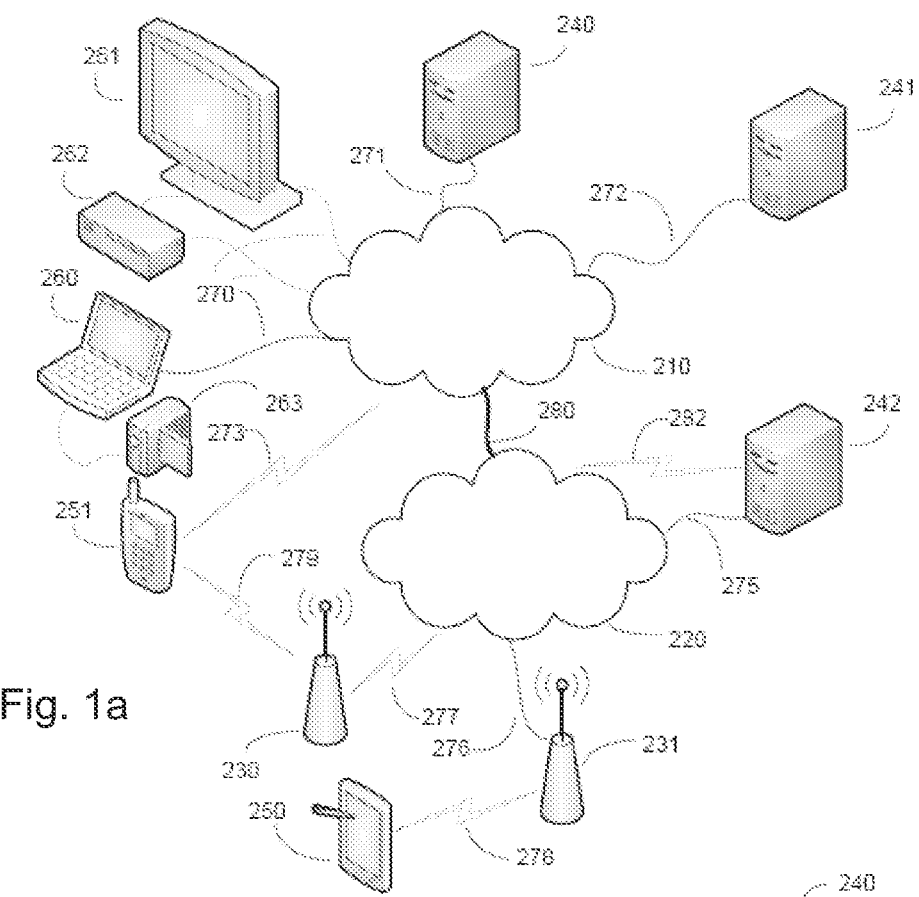
Figure 1B:
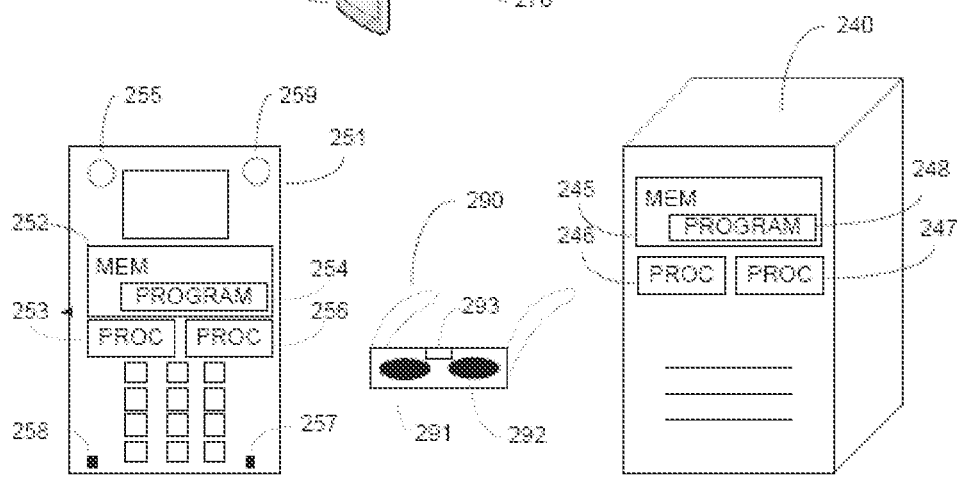

FIGS. 1a and 1b show a system and devices suitable to be used in an automatic video remixing service according to an embodiment. In FIG. 1a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 1a are shown servers 240, 241 and 242, each connected to the mobile network 220, which servers may be arranged to operate as computing nodes (i.e. to form a cluster of computing nodes or a so-called server farm) for the automatic video remixing service. Some of the above devices, for example the computers 240, 241, 242 may be such that they are arranged to make up a connection to the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 1b shows devices for automatic video remixing according to an example embodiment. As shown in FIG. 1b, the server 240 contains memory 245, one or more processors 246, 247, and computer program code 248 residing in the memory 245 for implementing, for example, automatic video remixing. The different servers 241, 242, 290 may contain at least these elements for employing functionality relevant to each server.

Similarly, the end-user device 251 contains memory 252, at least one processor 253 and 256, and computer program code 254 residing in the memory 252 for implementing, for example, gesture recognition. The end-user device may also have one or more cameras 255 and 259 for capturing image data, for example stereo video. The end-user device may also contain one, two or more microphones 257 and 258 for capturing sound. The end-user device may also contain sensors for generating the depth information using any suitable technology. The different end-user devices 250, 260 may contain at least these same elements for employing functionality relevant to each device. In another embodiment of this invention, the depth maps (i.e. depth information regarding the distance from the scene to a plane defined by the camera) obtained by interpreting video recordings from the stereo (or multiple) cameras may be utilised in the video remixing system. The end-user device may also have a time-of-flight camera, whereby the depth map may be obtained from a time-of-flight camera or from a combination of stereo (or multiple) view depth map and a time-of-flight camera. The end-user device may generate depth map for the captured content using any available and suitable mechanism.

The end user devices may also comprise a screen for viewing single-view, stereoscopic (2-view), or multiview (more-than-2-view) images. The end-user devices may also be connected to video glasses 290 e.g. by means of a communication block 293 able to receive and/or transmit information. The glasses may contain separate eye elements 291 and 292 for the left and right eye. These eye elements may either show a picture for viewing, or they may comprise a shutter functionality e.g. to block every other picture in an alternating manner to provide the two views of three-dimensional picture to the eyes, or they may comprise an orthogonal polarization filter (compared to each other), which, when connected to similar polarization realized on the screen, provide the separate views to the eyes. Other arrangements for video glasses may also be used to provide stereoscopic viewing capability. Stereoscopic or multiview screens may also be autostereoscopic, i.e. the screen may comprise or may be overlaid by an optics arrangement, which results into a different view being perceived by each eye. Single-view, stereoscopic, and multiview screens may also be operationally connected to viewer tracking such a manner that the displayed views depend on viewer's position, distance, and/or direction of gaze relative to the screen.

It needs to be understood that different embodiments allow different parts to be carried out in different elements. For example, parallelized processes of the automatic video remixing may be carried out in one or more processing devices; i.e. entirely in one user device like 250, 251 or 260, or in one server device 240, 241, 242 or 290, or across multiple user devices 250, 251, 260 or across multiple network devices 240, 241, 242, 290, or across both user devices 250, 251, 260 and network devices 240, 241, 242, 290. The elements of the automatic video remixing process may be implemented as a software component residing on one device or distributed across several devices, as mentioned above, for example so that the devices form a so-called cloud.

An embodiment relates to a method for performing parallel video cutting, re-encoding, and merging of video segments within an automatic video remixing service, i.e. an editing service. The service is implemented in at least one, but preferably in a plurality of computing nodes (i.e. a cluster of computing nodes or a server farm), which are able to execute more than one process or thread in parallel. The automatic video remixing service is supplied with one or more video recordings and information regarding suitable cutting points of desired segments from the video recordings. The information regarding the suitable cutting points of segments can be provided in various ways. The cutting points may be obtained a priori via any suitable method (e.g., by content analysis of the source videos or even manually, from a human input) and then supplied to the video remixing service along the one or more video recordings. In addition to that, more cutting points may be utilized by the video remixing service by directly analyzing the one or more video recordings or specific contextual information associated with them. The video remixing service may analyse the video recordings either without any additional information or by exploiting contextual information such as sensor (gyroscope, accelerometer, compass or other sensors) data recorded simultaneously with the source videos. Embodiments relating to such analysis will be described more in detail further below.

For carrying out the creation of the actual remix, a list of desired segments is created and on the basis of the list, a job is created, which may comprise cutting the source videos into desired segments, decoding of at least one desired segment in case the source video is already encoded and/or video encoding of at least one desired segment such that it starts with an intra-coded frame.

According to an embodiment, if the source videos are already encoded with a desired video encoder, the cutting and the re-encoding are done in such a manner that a cut segment is not fully re-encoded but only the frames that are in between the desired cutting location and the location of the following intra coded frame are encoded. If the desired cutting location is pointing to an intra coded frame, then re-encoding of the segment is not performed.

According to another embodiment, if at least one desired segment is to be totally re-encoded, then additional cutting points may be allocated in order to ensure that the maximum segment duration is smaller than a predefined threshold. The additional cutting points may improve the parallelization of the cutting and the re-encoding.

When the necessary one or more jobs have been defined, they are sent to a job scheduler implemented in a computing node for parallel execution. After all jobs have finished, the merging of the segments may also be performed in parallel, for example by following a binary-tree path, where in each step, each two consecutive segments are merged, and this is continued until the final video remix has been created.

Figure 2:
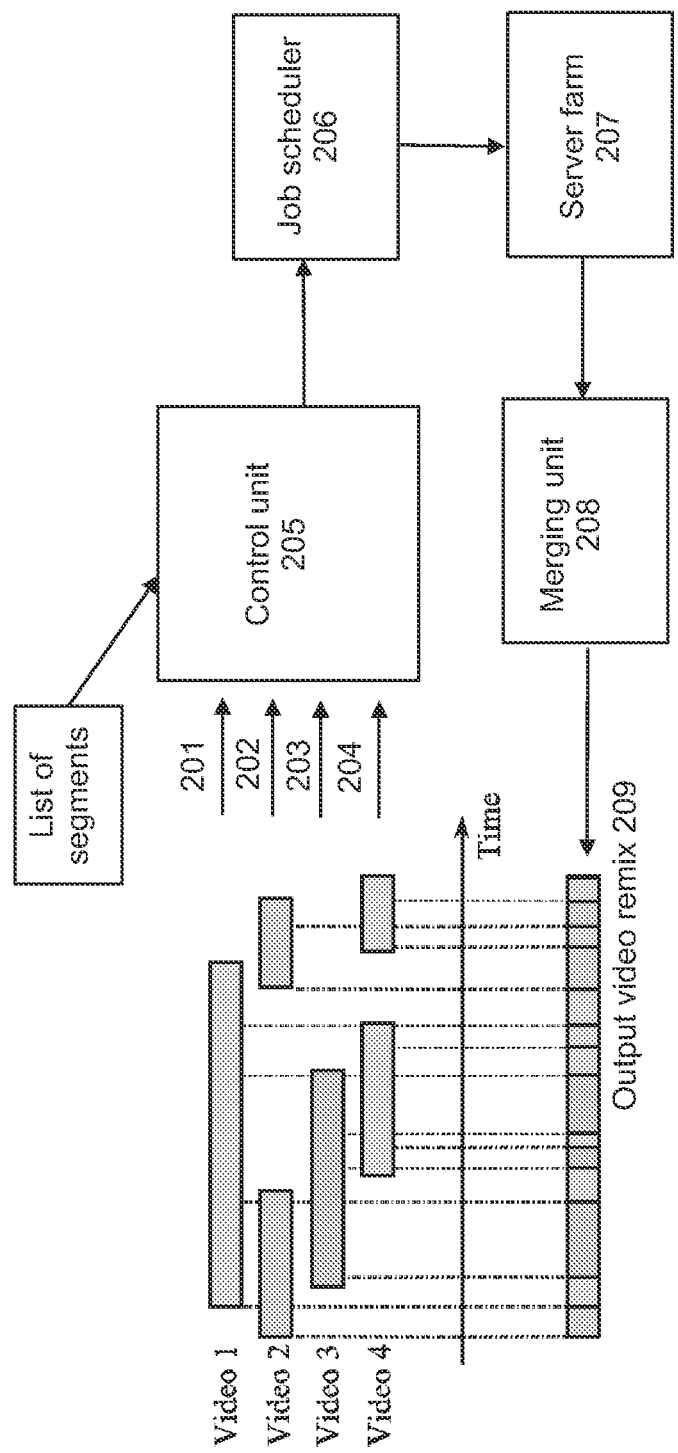
FIG. 2 shows a block chart of an implementation embodiment for the automatic video remixing service.

The implementation of the parallel video cutting and re-encoding of video segments as described above is now illustrated more in detail by referring to FIG. 2, which discloses an example of the implementation for the automatic video remixing service. The automatic video remixing service comprises a control unit 205 for determining the desired video remix and the segments to be included therein. As the input data for the video remixing service, there is provided a plurality of source videos 201, 202, 203, 204 (Video 1-Video 4), which may, but not necessarily need to be encoded, for example, by any known video coding standard, such as MPEG 2, MPEG4, H.264/AVC, etc. The source videos may be originated from one or more end-user devices or they may be loaded from a computer or a server connected to a network. Additionally, the control unit 205 may be provided with or be arranged to determine a list of desired segments to cut and subsequently to merge in the final video remix. The items of the list of segments may preferably contain information about the source video, the starting time or the frame number of the segment to be cut and the duration of the segment, either in time or in number of frames.

As can be seen in FIG. 2, the source videos may be more or less overlapping in time domain. Therefore, at least for those overlapping periods priorities could be assigned to the items in the list of segments. According to an embodiment, this could be achieved by sorting the list by the duration of the segments in descending order.

If the source videos are already encoded with a desired video encoder, the need for re-encoding is determined by the frame type of the first frame of the segment to be cut. If the first frame of the desired cutting location is an intra coded frame, then there is no need for any re-encoding of the segment. If the first frame of the desired cutting location is a predicted frame, then the cutting and the re-encoding are carried out such that a cut segment is only partially re-encoded according to a principle that only the frames that are in between the desired cutting location and the location of the following intra coded frame are encoded.

Figure 3:
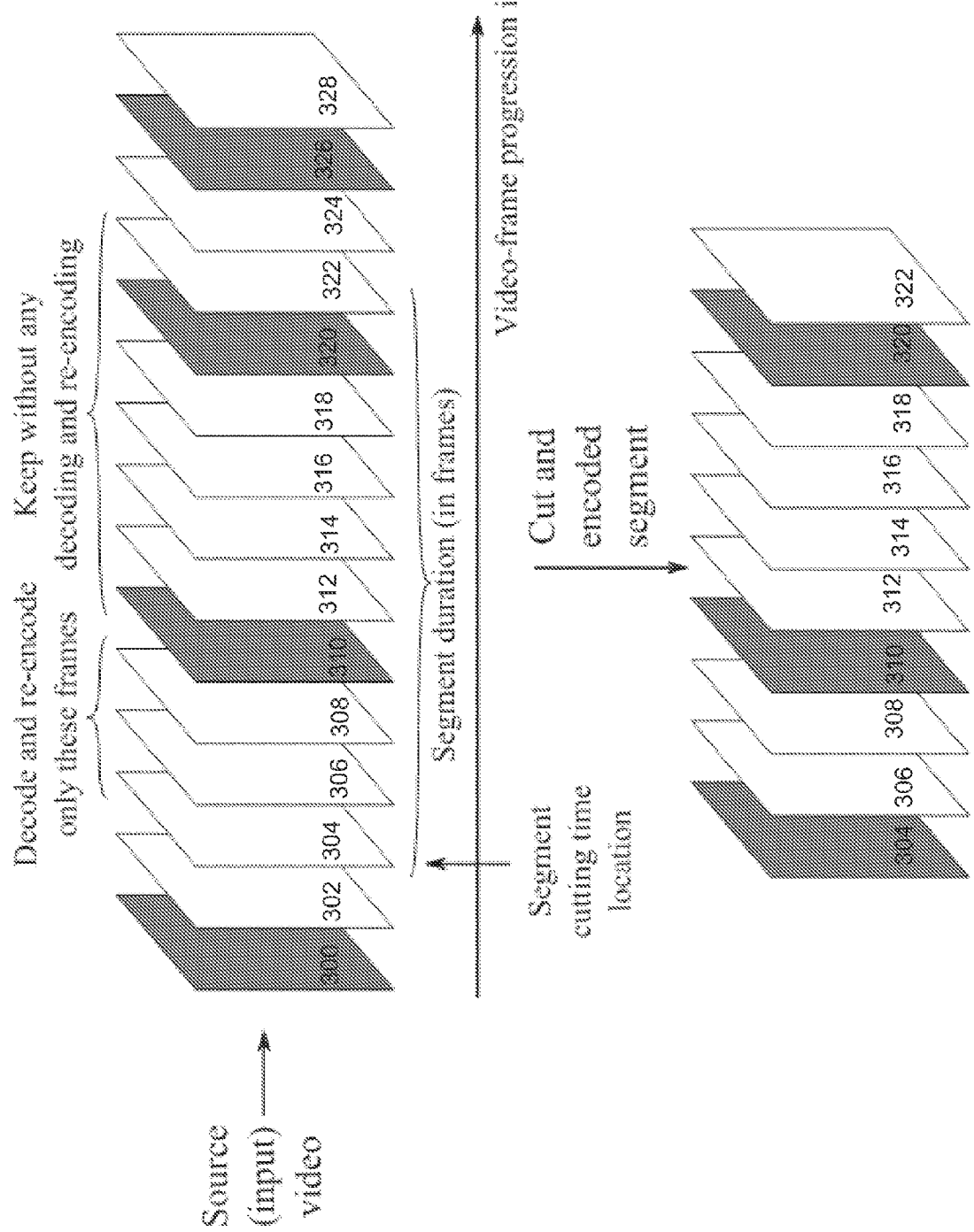
FIG. 3 shows a partial re-encoding method of a video segment according to an embodiment.

This is illustrated in FIG. 3, wherein a source video comprises at least the frames 300-328, the frames 300, 310, 320 and 326 being intra frames and the rest of the frames being predicted frames. The segment to be cut in this example is the frames 304-322, i.e. the segment starts from a predicted frame and the first intra frame is the frame 310. Thus, only the frames 304, 306 and 308 are decoded and re-encoded such that the first frame 304 is encoded as an intra frame. The remaining part of the segment, i.e. the frames 310-322, is included in segment without any modifications.

If a source video is not encoded or it is encoded but not with the desired video encoder, then all desired segments from said source video need to be re-encoded. According to an embodiment, additional cutting points may be allocated in the segments in order to ensure that the maximum segment duration is smaller than a predefined threshold, $T_s$. The threshold $T_s$ can be set such that the minimum processing time would be equal to the encoding time of a segment with duration $T_s$. This typically leads to a relatively short time interval (e.g., 0.5-1 sec) for the duration $T_s$.

According to another embodiment, the value for the threshold $T_s$ may be defined from the perspective of the optimal utilization of the processing power of the computing nodes. Let us denote the maximum number of processes that can be executed in parallel as $N_p$; accordingly, for a cluster with X number of computing nodes, each having Y number of CPUs, $N_p=X*Y$. In this case, $T_s$ is set so that the overall number of segments is not smaller than $N_p$. Each segment whose duration is greater than $T_s$ is split into segments with durations shorter than or equal to $T_s$.

According to an embodiment, if the source videos contain auxiliary information, such as sensor data preferably recorded simultaneously with the video and having synchronized timestamps with it, the additional cutting points can be introduced at or close to estimated scene changes, wherein the existence of scene changes is estimated based on the sensor data. For example, the scene changes may be detected using the context sensor data (e.g., a gyroscope, an accelerometer, or a compass of the recording device), and additional cutting points may be introduced at or close to estimated scene changes.

Following the priorities/order, for each segment, the control unit 205 creates a job that comprises at least one of following editing processes: cutting the source videos into desired segments, video decoding of the desired segment (only in case the source video is already encoded) and/or video encoding of the desired segment so that it starts with an intra-coded frame.

The control unit 205 sends the obtained jobs to a job scheduler 206 controlling the execution of the jobs parallel in the computing nodes. The job scheduler 206 distributes individual tasks (processes) for parallel execution in at least one processing device, but preferably in several nodes of the server farm 207. The parallel execution may comprise any of the tasks of cutting, decoding and re-encoding. After all jobs have been finished, the merging of the segments is also performed by a merging unit 208 in parallel by following a binary-tree path, where in each step, each two consecutive segments are merged, which is performed until the final output video remix 209 has been created. The control unit 205, the job scheduler 206 and the merging unit 208 may be implemented as computer program codes executed in at least one processing device; e.g. in an end-user device or in one or more computing nodes of the server farm.

In the automatic video remixing service described above, it would be beneficial to provide the customers with a time estimate for creating a video remix. It would also be beneficial to enable a customer, for example a priority customer, to request a video remix to be created within certain period of time. According to an embodiment, these needs are addressed by a method for a time-interval demand (referred to as TID herein below) based generation of a video remix using the source videos and the context data corresponding to the source videos.

A TID based generation of a video remix may include a workload manager, which receives the jobs from the job scheduler and assigns video segment cutting, decoding and re-encoding jobs to multiple workers; in this context, a worker can be a CPU or a CPU core on a server machine or on a computing node. The workload manager uses an algorithm to share the workload such that the total execution time for remix generation is minimized, preferably within the demanded time-interval (i.e., execution time<TID).

Figure 4:
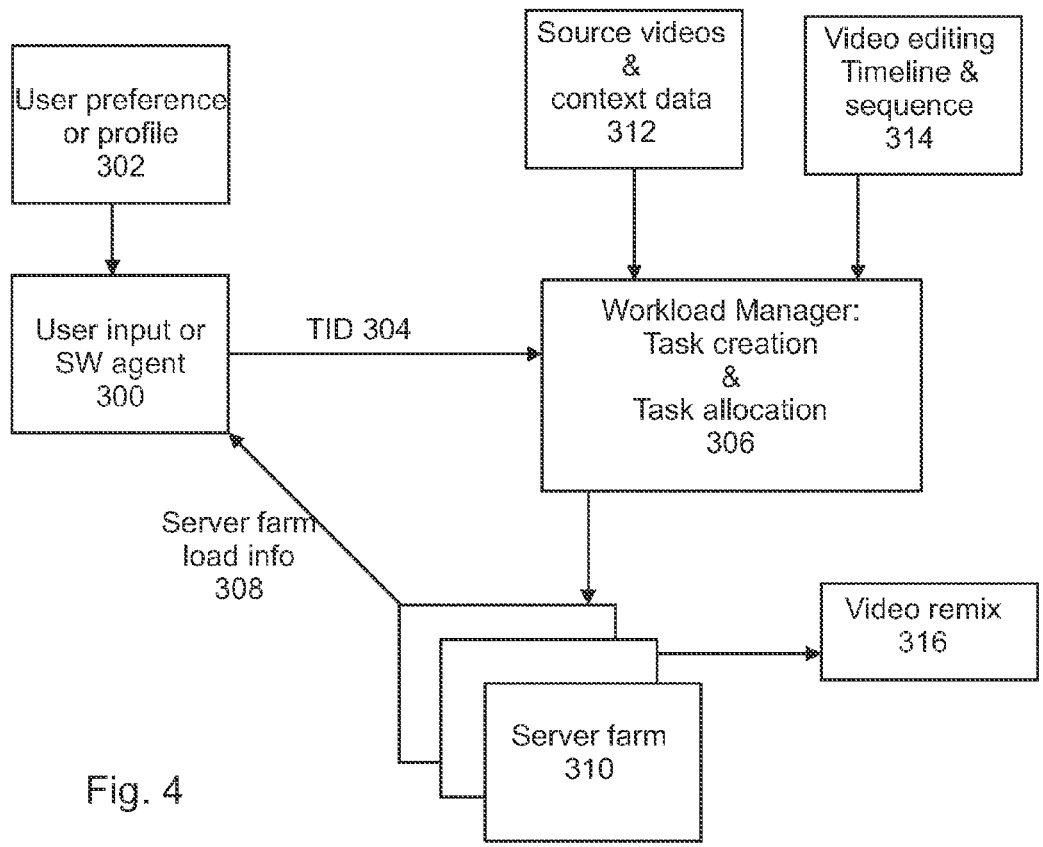
FIG. 4 shows a system for a time-interval demand based generation of video remix according to an embodiment.

FIG. 4 shows an exemplary illustration of a system for generating a time-interval demand (TID) based generation of video remix. In the system, a user 300 requesting a remix or a software agent 300 based on user preference/profile 302 may signal the TID 304 to the workload manager 306 that assigns the video segment cutting and re-encoding jobs to multiple workers. Alternatively, the user requesting a remix or the software agent based on user preference/profile may analyze the current work load 308 on the server 310 (or a server farm) for calculating the best suited TID and subsequently signal the TID to the workload manager that assigns the video segment cutting, decoding and re-encoding jobs to multiple works. In addition to the server load information, the user or the software agent may use a further set of input parameters to derive a TID value that is optimal for generating the remix with the smallest possible delay without overloading the server farm. The further set of input parameters for determining the TID value may include one or more of the following:

User preference for quick response time in receiving the video remixes.

User payment profile information. For example, whether the user is a premium customer of the service or using the best-effort free version, whereby the premium customer is provided with a shorter TID.

User's current presence status. For example, if the user's status is observed to be "inactive" or "do not disturb", a longer TID for video remix generation may be sufficient.

The workload manager, after receiving the TID value, analyzes, based on the jobs 312 received from the job scheduler, the video editing timeline and sequence information 314. Based on the video editing timeline and sequence information, if the creation of the requested video remix 316 from the obtained individual video segment lengths seem to need a longer execution time than the requested TID value, the individual video segments may be divided further into shorter segments to enable faster parallel processing.

Regarding the server load information, it is obvious that for each configuration of servers or computing nodes available for generating a video remix, there will be a limit on the amount of processing of multiple video segments that can be carried out simultaneously and in parallel. Based on the limit value and measurements of the prevailing load on the servers or computing nodes, the server load information is gathered and provided to the software agent that determines the target TID.

The total time to obtain the video remix (TTVR) would be a summation of analysis time (TA), if any, for video editing timeline/sequence and TID.

TTVR=TID+TA.

The source video content and context analysis may be performed for individual source videos prior to receiving the video remix generation request. Also, content and context analysis required to be performed on the group of source videos constituting the input for generating the remix may be performed incrementally with addition of individual source videos to the group. This approach separates the generation of data required for making the decisions about the timeline from the generation of sequence of video segments to be included in the video remix. Consequently, the TA component becomes a very small portion of the TTVR value, thereby enabling the service to have an estimate of the TTVR value based on the previously mentioned TID derivation parameters.

After the video remix has been generated, the server farm 310 delivers the output video remix 316 which can subsequently be delivered to the end user in any suitable manner.

When performing automatic video remixing from multiple source videos, it would be beneficial to know the type of the video shots included in the segments. In cinematography, the type of the video shots is typically classified in one of the three categories: long shots, medium shots, and close-ups.

A close-up shows a fairly small part of the scene, such as a character's face, or depicts human characters from the breast upwards, in such a detail that it almost fills the screen. In a medium shot, a lower frame line typically passes through the body of a human character from the waist down to include the whole body. In a medium shot, the human character and surrounding scene occupy roughly equal areas in the frame. Long shots show all or most of a fairly large subject (e.g. a person) and usually much of the surroundings. This category comprises also extreme long shots, where the camera is at its furthest distance from the subject, emphasising the background.

This information enables proper switching between video segments with compatible views such as between a long shot and a close-up and avoids switching between non-compatible views such as between two long shots.

According to an embodiment, the automatic video remixing service that combines the source videos in order to obtain a single video remix may utilise information about video-shot types and obstructing objects in the source videos to decide from which source videos the segments shall be selected for the video remix. Accordingly, the detected video-shot type is used to specify which videos to use in the individual segments so that the following conditions are met:

View switching from a close-up to another close-up or to a medium or to a long shot.
View switching from a medium shot to a close-up or to a long shot.
View switching from a long shot to a medium shot or to a close-up.

In addition to these rules, it is possible to use further, possibly user-specified, rules to select the allowed video-shot type. For example, switching from a close-up to another close-up can be disabled.

According to an embodiment, the information about the video-shot types and obstructing objects can be obtained by a method comprising detecting the type of video shots (close-up, medium shot, or long shot) based on a depth map of the recorded scene;
detecting objects that obstruct the view (i.e., objects that are not desired and impede the view of the recorded video) based on a depth map of the recorded scene; and
indexing the corresponding video with the detected events mentioned above.

A depth map provides depth information of a 2-D image, where the 2-D image represents an actual 3-D scene. A standard representation of a depth map is a 2-D array whose indices represent spatial coordinates and whose range (element values) convey information about the depth i.e., the distance from the scene to a plane defined by the capturing device. It is herein assumed that the depth can be interpreted as absolute distance (e.g., in meters).

There are several methods for computing or estimating depth maps, known as such. Many methods enable to compute the depth maps in real-time, which is required for TV broadcasting. As mentioned above, portable devices with digital stereo (or multiple) cameras and/or camcorders are able to perform depth map estimation. Furthermore, depth maps can be obtained using other well-established methods, such as by using time-of-flight (ultrasonic, infrared, or laser) cameras.

According to an embodiment, the depth maps are obtained by interpreting stereo (or multiple) camera video recordings. According to another embodiment, the depth map is obtained from a time-of-flight camera or from a combination of stereo (multi) view depth map and a time-of-flight camera. However, the method used for computing or estimating depth maps is not relevant for the embodiments herein, but it is assumed that the source videos are provided with depth maps of some or of all video frames from these recordings.

The depth maps can have different resolution than the video frames and either linear or non-linear quantization can be used to encode the depth values. Regardless of this quantization, it is assumed that the depth values can be interpreted in terms of absolute distance of the scene to the sensor plane of the image/video/depth acquisition device. Let us denote the spatial coordinates of a depth map as x and y and the depth information as $Z(x,y)$. Furthermore, the reliability of the corresponding depth values $R(x,y)$ may optionally be provided as a 2-D array with the same size as the depth map. In addition, the maximum depth that can be detected is denoted with $Z_{max}$.

In order to carry out the detection of the type of the video shot and the obstructing objects, the depth maps of the corresponding video frames are analysed. This can be performed, for example, by positioning a certain amount of non-overlapping regions of interest (ROIs) in the depth maps of the video frames. FIG. 5 gives an illustration of using 25 rectangular ROIs. However, the spatial shape and size of the ROIs can be arbitrary, and it is not limited to rectangular shapes. The only requirement for the selection of these ROIs is that there should be one ROI selected as a central ROI and at least one other ROI. Subsequently, the depth within each ROI is extracted. One method to accomplish this is to perform weighted averaging, $$Z_{ROI(k)} = \frac{\sum_{x,y \in ROI(k)} Z(x,y) W(x,y)}{\sum_{x,y \in ROI(k)} W(x,y)}$$

where ROI (k) contains the spatial coordinates of the $k_{th}$ ROI, and reliability measures $R(x,y)$ are used as weights $W(x,y)$ if they are available, otherwise the weights $W(x,y)$ are assumed to be unity (i.e., corresponding to averaging of the depth values), $$W(x,y) = \begin{cases} R(x,y), & \text{if available} \\ 1, & \text{otherwise.} \end{cases}$$

FIG. 6 shows a possible implementation for detecting the type of video shots on the basis of the depth map of the recorded scene. As a first step (600), the depth values of all ROIs are obtained, for example in the manner described above. Then it is examined (602), whether the depth values of all ROIs meet the criteria of a close-up shot. If the majority of ROIs (i.e. defined by a certain percentage, $N_{closeup}$, of all ROIs) have substantially similar depths that fall within a distance range around the depth of the central ROI, which should be different than $Z_{max}$; the distance range is predefined by a distance parameter, $D_{closeup}$, then a close-up is detected (604). If the depth values of all ROIs do not meet the criteria of a close-up shot, then it is examined (606), whether the depth values of all ROIs meet the criteria of a medium shot. Accordingly, if the criteria for a close-up are not met and at least $N_{medium}$ (a predefined threshold where $N_{medium} < N_{closeup}$) percent of the ROIs have depths that belong a distance range $D_{medium}$ around the depth of the central ROI, which should be different than $Z_{max}$, then a medium shot is detected (608). If the criteria for a close-up or a medium shot are not satisfied, then a long shot is detected (610). Finally, the source video is indexed according to the detected shot type (612).

FIG. 7 shows a possible implementation for detecting objects that obstruct the view on the basis of the depth map of the recorded scene. Again as a first step (700), the depth values of all ROIs are obtained, for example in the manner described above. The implementation relies on a prior knowledge of the expected location of obstructing objects. For example, when recording an event in a crowded area, obstructing objects are often the people who are between the camera and the scene of interest and these people occupy the lower portion of the scene. Therefore, based on this information or assumption about the video recording, the expected location of obstructing objects can be defined (702). Next, all the ROIs that fall within the expected location of obstructing objects are detected, and the depth of the detected ROIs is averaged (704). In the similar manner, the depth of the remaining ROIs is averaged (706). The average depth of all the ROIs that fall within the expected location of obstructing objects compared to the average depth of all other ROIs (708). If the difference between said averaged depths is larger than a predefined threshold, $D_{obs}$, then an obstructing object is detected, and the source video is indexed to include then an obstructing object (710). Naturally, video segments which contain objects that impede the view of the recorded video are less likely to be included in the automatic video remix.

According to another embodiment, detecting objects that obstruct the view scene in video recordings may be based on a change in the video-shot type. In this embodiment, momentarily changes in the video shot type are detected; it is observed whether there is a change in the video-shot type with duration that is less than a predefined threshold. The following cases are considered as cases of objects obstructing the view: if after a long shot, there appears a close-up or a medium shot with duration shorter than said predefined threshold, or if after a medium shot, there appears a close-up with duration shorter than said predefined threshold. The above cases are considered to include the scenario when an object momentarily obstructs the view to the desired scene. For example, a person or vehicle passing in front of the camera can be such an obstructing object.

The detection and the indexing may be carried out for video segments of either fixed or variable length, thereby accommodating for changes in the video shot type or appearance of obstructing objects during the video recording. The indexing of the video with the detected video-shot type and obstructing objects may be performed by assigning a timestamp (relative with the beginning of the video recording) to the detected events and transmitting this information as video metadata.

The depth map may be utilised in many further embodiments. According to an embodiment, the depth map is used to filter out any content with object whose distance is beyond a predefined threshold(s). There may be a minimum distance to be exceeded or a maximum distance not be exceeded. The video segments with depth greater than the maximum distance or less than the minimum distance may be labeled as "too far content" or "too near content", respectively. This labeling information may be utilised by different applications like multimedia search, multimedia tagging, automatic remixing, etc.

According to another embodiment, a plurality of end-user image/video capturing devices may be present at an event. For example, this can automatically be detected based on the substantially similar location information (e.g., from GPS or any other positioning system) or via presence of a common audio scene. Then the depth maps from the end-user devices may be used to determine the type of event. For example, if the depth map of multiple end-user devices is static or changing within a threshold for a temporal window under consideration, this may be used to determine that the event involves a static viewing area. A rapidly changing depth map with changes above a predefined threshold may be used to determine that the event is an event with free movement of the users. A depth map that is observed to change less than a predefined threshold may be used to determine that the event is an event with restricted movement of users.

According to another embodiment, the depth map and orientation information from a plurality of end-user devices present at an event may be used to determine the relative position of the users at the event. If the orientation of at least two users is within a threshold and their depth map have a pattern that is indicating similar object boundaries, the difference in their depth map may be used to determine their relative position to each other and also with relation to the similar object pattern observed in the depth map.

Objects of interest, such as a face, can be detected based on the fact that they will display only a small change in depth value within the object boundary. The depth at the center of the detected object boundary may be compared with a predefined threshold in order to determine if the object is too near or too far for being of interest to a wider audience or an object of personal interest. If the same object boundary pattern is detected within a temporal window threshold of more than one end-user devices at an event, the end-user devices being at an orientation value within a predefined threshold, the distance between the users can be approximated based on the difference in the depth-map corresponding to the center of the object.

A skilled man appreciates that any of the embodiments described above may be implemented as a combination with one or more of the other embodiments, unless there is explicitly or implicitly stated that certain embodiments are only alternatives to each other.

The various embodiments may provide advantages over state of the art. For example, the video remix generation system using a cluster of computing nodes or a server farm in parallel may reduce the time to generate the video remix. The video remix generation time does not increase in direct proportion to the duration of the video remix. The video remix generation time can be controlled based on server load and/or available server hardware. Providing customizable (e.g. based on payment profile) video remix time estimates as well as personalized video remix availability time estimates may improve the user experience. Detecting video-shot types and detecting obstructing objects can be performed without computationally-expensive video content-analysis. Depending on the choice of ROIs, the complexity of the detection may be reduced in order to enable implementation on a resource-limited portable device. The reliability of the detection of semantic information from content recorded at the events may be improved by exploiting the depth information.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment. The various devices may be or may comprise encoders, decoders and transcoders, packetizers and depacketizers, and transmitters and receivers.

It is obvious that the present invention is not limited solely to the above-presented embodiments, but it can be modified within the scope of the appended claims.

The invention claimed is:

1. A method for creating a video remix, the method comprising:
   obtaining a plurality of source content in a processing device;
   determining a plurality of segments from the source content to be included in the video remix;
   determining editing processes required to transform the plurality of segments into form suitable for the video remix;
   allocating said editing processes to be executed in parallel in at least one processing device; and
   merging, in parallel according to a predetermined path, the plurality of segments received from said editing processes into the video remix, wherein
   in response to a source video being encoded with a desired encoder and a cutting point of a segment located at a predicted frame, the method further comprises: decoding video frames only from said predicted frame to a predicted frame preceding a next intra-coded frame of the segment or to an end of the segment if there is no subsequent intra-coded frame in the segment and encoding said decoded video frames with said desired encoder such that the predicted frame located at the cutting point of the segment is encoded as an intra-coded frame.

2. A method according to claim 1, wherein the source content comprises at least one of video, audio and/or image, and said editing processes comprise at least one of the following:
   cutting at least one source content into plurality of segments;
   decoding at least a part of a segment of a source content;
   encoding at least a part of a segment of a source content.

3. A method according to claim 2, wherein
   in response to a segment of a source content being decoded and re-encoded, the method further comprises:
   allocating additional cutting points for said segment.

4. A method according to claim 3, wherein
   in response to a source content comprises auxiliary information enabling to estimate an existence of one or more scene changes, the method further comprising:
   allocating said additional cutting points for the segments at or close to the estimated one or more scene changes.

5. A method according to claim 4, wherein
   said auxiliary information comprises sensor data with timestamps synchronized with the source content.

6. A method according to claim 1, the method further comprising
   receiving a user request for creating a video remix, said user request including a request to create the video remix within a time period;
   determining an optimal allocation of the editing processes such that the editing processes are optimized according to available processing power of said at least one processing device and the video remix can be created within said time period; and
   allocating said editing processes to be executed in parallel in at least one processing device according to said optimal allocation.

7. A method according to claim 1, the method further comprising
   receiving a user request for creating a video remix, said user request including a request to create the video remix within a time period, wherein the time period has been determined by a user device according to workload information from said at least one processing device.

8. A method according to claim 1, the method further comprising
   obtaining depth maps for at least some frames of a source video;
   detecting at least one of a type of a video shot and an object obstructing a view in the source video based on the depth map; and
   indexing the source video according to at least one of the detected type of a video shot and the detected object obstructing a view.

9. A method according to claim 8, the method further comprising
   performing said indexing by assigning, for the detected type of a video shot or the detected object obstructing a view, a timestamp relative with the beginning of the source video; and
   transmitting information relating to said indexing as metadata for the source video.

10. The method according to claim 1, wherein each two consecutive segments of the binary tree path are merged.

11. An apparatus comprising at least one processor, and memory including computer program code, the memory and the computer program code configured to, with the at least one processor, cause the apparatus to at least:
    obtain a plurality of source content;
    determine a plurality of segments from the source content to be included in a video remix;
    determine editing processes required to transform the plurality of segments into form suitable for the video remix;
    allocate said editing processes to be executed in parallel in at least one processing device; and
    merge, in parallel according to a predetermined path, the plurality of segments received from said editing processes into the video remix, wherein in response to a source video being encoded with a desired encoder and a cutting point of a segment located at a predicted frame, the apparatus is further caused to: decode video frames only from said predicted frame to a predicted frame preceding a next intra-coded frame of the segment or to an end of the segment if there is no subsequent intra-coded frame in the segment and encode said decoded video frames with said desired encoder such that the predicted frame located at the cutting point of the segment is encoded as an intra-coded frame.

12. An apparatus according to claim 11, wherein the source content comprises at least one of video, audio and/or image, and said editing processes comprise at least one of the following:
   cutting at least one source content into plurality of segments;
   decoding at least a part of a segment of a source content;
   encoding at least a part of a segment of a source content.

13. An apparatus according to claim 12, further comprising computer program code configured to, with the at least one processor, cause the apparatus to at least:
   in response to a segment of a source content being decoded and re-encoded,
   allocate additional cutting points for said segment.

14. An apparatus according to claim 11, further comprising computer program code configured to, with the at least one processor, cause the apparatus to at least:
   receive a user request for creating a video remix, said user request including a request to create the video remix within a time period;
   determine an optimal allocation of the editing processes such that the editing processes are optimized according to available processing power of said at least one processing device and the video remix can be created within said time period; and
   allocate said editing processes to be executed in parallel in at least one processing device according to said optimal allocation.

15. An apparatus according to claim 11, further comprising computer program code configured to, with the at least one processor, cause the apparatus to at least:
   receive a user request for creating a video remix, said user request including a request to create the video remix within a time period, wherein the time period has been determined by a user device according to workload information from said at least one processing device.

16. An apparatus according to claim 11, further comprising computer program code configured to, with the at least one processor, cause the apparatus to at least:
   obtain depth maps for at least some frames of a source video;
   detect at least one of a type of a video shot and an object obstructing a view in the source video based on the depth map; and
   index the source video according to at least one of the detected type of a video shot and the detected object obstructing a view.

17. An apparatus according to claim 16, wherein the depth map and orientation information from a plurality of user devices present at an event is used to determine the relative position of the users at the event.

18. An apparatus according to claim 16, wherein the depth map from a plurality of user devices present at an event is used to determine the type of the event.

19. An apparatus according to claim 11, wherein each two consecutive segments of the binary tree path are merged.

20. A computer program embodied on a non-transitory computer readable medium, the computer program comprising instructions causing, when executed on at least one processor, at least one apparatus to:
   obtain a plurality of source content;
   determine a plurality of segments from the source content to be included in a video remix;
   determine editing processes required to transform the plurality of segments into form suitable for the video remix;
   allocate said editing processes to be executed in parallel in at least one processing device; and
   merge, in parallel according to a predetermined path, the plurality of segments received from said editing processes into the video remix, wherein in response to a source video being encoded with a desired encoder and a cutting point of a segment located at a predicted frame, the apparatus also caused to: decode video frames only from said predicted frame to a predicted frame preceding a next intra-coded frame of the segment or to an end of the segment if there is no subsequent intra-coded frame in the segment and encode said decoded video frames with said desired encoder such that the predicted frame located at the cutting point of the segment is encoded as an intra-coded frame.

21. An apparatus comprising:
   means for obtaining a plurality of source content;
   means for determining a plurality of segments from the source content to be included in a video remix;
   means for determining editing processes required to transform the plurality of segments into form suitable for the video remix;
   means for allocating said editing processes to be executed in parallel in at least one processing device; and
   means for merging, in parallel according to a predetermined path, the plurality of segments received from said editing processes into the video remix, wherein the in response to a source video being encoded with a desired encoder and a cutting point of a segment located at a predicted frame, the apparatus further comprises: means for decoding video frames only from said predicted frame to a predicted frame preceding a next intra-coded frame of the segment or to an end of the segment if there is no subsequent intra-coded frame in the segment and means for encoding said decoded video frames with said desired encoder such that the predicted frame located at the cutting point of the segment is encoded as an intra-coded frame.

* * * * *